(12) United States Patent
Kasai

(10) Patent No.: US 6,965,188 B2
(45) Date of Patent: Nov. 15, 2005

(54) ULTRASONIC-ACTUATOR DRIVING APPARATUS AND ULTRASONIC-ACTUATOR DRIVING METHOD

(75) Inventor: Yasuaki Kasai, Hachioji (JP)

(73) Assignee: Olympus Corporation, Tokyo (JP)

( * ) Notice: Subject to any disclaimer, the term of this patent is extended or adjusted under 35 U.S.C. 154(b) by 38 days.

(21) Appl. No.: 10/818,122

(22) Filed: Apr. 5, 2004

(65) Prior Publication Data

US 2004/0201308 A1   Oct. 14, 2004

(30) Foreign Application Priority Data

Apr. 8, 2003  (JP) ............................. 2003-104486

(51) Int. Cl.$^7$ ............................. H02N 2/08; H02N 2/16; H01L 41/08
(52) U.S. Cl. ............ 310/317; 310/316.01; 310/316.02; 318/116
(58) Field of Search ................................ 310/316, 317; 318/116

(56) References Cited

U.S. PATENT DOCUMENTS

| | | | |
|---|---|---|---|
| 4,587,958 A * | 5/1986 | Noguchi et al. ................ 601/2 |
| 5,365,139 A * | 11/1994 | Kasuga et al. ......... 310/316.02 |
| 5,416,374 A * | 5/1995 | Inoue et al. ................. 310/317 |
| 5,438,229 A * | 8/1995 | Ohtsuchi et al. ........ 310/316.02 |
| 5,767,609 A * | 6/1998 | Suganuma .............. 310/316.02 |
| 6,031,316 A | 2/2000 | Kataoka ...................... 310/316 |
| 2004/0201308 A1 * | 10/2004 | Kasai .......................... 310/317 |
| 2005/0052095 A1 * | 3/2005 | Kasai et al. ................. 310/317 |
| 2005/0116583 A1 * | 6/2005 | Nishio et al. ............... 310/317 |

\* cited by examiner

Primary Examiner—Darren Schuberg
Assistant Examiner—J. Aguirrechea
(74) Attorney, Agent, or Firm—Scully, Scott, Murphy & Presser

(57) ABSTRACT

An ultrasonic-actuator driving apparatus includes an ultrasonic actuator including a transducer and a driven body that is in contact with the transducer, the transducer to which a frequency signal is applied friction-driving the driven body; an original-signal outputting unit for outputting an original signal; a waveform averaging unit for averaging the original signals during a predetermined period to calculate average-waveform data; a position detecting unit for detecting an absolute position of the driven body with respect to the transducer; a position averaging unit for averaging the absolute positions during a predetermined period to calculate average-position data; a control-signal calculating unit that generates a control signal for controlling the frequency of the original signal based on the average-waveform data and the average-position data and supplies the control signal to the original-signal outputting unit; and a driving unit for generating the frequency signal based on the original signal and applying the frequency signal to the transducer.

18 Claims, 9 Drawing Sheets

ULTRASONIC-ACTUATOR DRIVING APPARATUS AND ULTRASONIC-ACTUATOR DRIVING METHOD

This application claims benefit of Japanese Application NO. 2003-104486 filed in Japan on Apr. 8, 2003, the contents of which are incorporated by this reference.

BACKGROUND OF THE INVENTION

1. Field of the Invention

The present invention relates to ultrasonic-actuator driving apparatuses and ultrasonic-actuator driving methods. More particularly, the present invention relates to an ultrasonic-actuator driving apparatus and an ultrasonic-actuator driving method in which applying frequency signals to an ultrasonic transducer in an ultrasonic actuator friction-drives a driven body that is in contact with the ultrasonic transducer.

2. Description of the Related Art

Ultrasonic motors (also referred to as ultrasonic actuators) have drawn attention in recent years as new motors which can be used in place of electromagnetic motors. The ultrasonic actuators have the following advantages, compared with known electromagnetic motors.

(1) Low speed and high torque yielded without using gears
(2) High maintaining power of driving force
(3) Long stroke and high resolution
(4) Quiet
(5) No magnetic noise produced and no noise influence A driving apparatus ordinarily drives each of the ultrasonic actuators having the above advantages.

Known arts involving such a driving apparatus for an ultrasonic actuator include a controlling apparatus for a vibration actuator disclosed in U.S. Pat. No. 6,031,316.

The controlling apparatus for a vibration actuator (also referred to as an ultrasonic actuator) disclosed in the above publication evaluates a real moving state of a driven body (moving body) for driving the ultrasonic actuator in order to overcome the problem in that the position control of the ultrasonic actuator is unstable.

In other words, the controlling apparatus for an ultrasonic actuator has a moving-state detecting unit for outputting signals corresponding to the absolute motion of the driven body with respect to the ultrasonic actuator. The signals output from the moving-state detecting unit are sampled at a timing being synchronized with a multiple-fold frequency of the vibration frequency of the ultrasonic actuator to evaluate the moving state based on a value in accordance with the average value of the sampled signals.

Specifically, as shown in FIG. 1 of the drawings of the U.S. Pat. No. 6,031,316, signals detected by a rotary encoder 6, which corresponds to the moving-state detecting unit, are supplied to a counter 9, which counts the signals. Edges of signals (S-phase pulse signals) detected in a vibration detecting element provided in an electro-mechanical energy conversion element are detected by a pulse-edge detecting circuit and latch signals are supplied to a latch for latching the counter values. In this case, the counter values are latched at rising edges and falling edges of the S-phase pulse signals to be supplied to an adder for addition. The values added in the adder are used to calculate an average value in a CPU. The moving state is evaluated by using the average value as a central value (a real value) of the counter values.

SUMMARY OF THE INVENTION

An ultrasonic-actuator driving apparatus of the present invention includes an ultrasonic actuator having a transducer and a driven body that is in contact with the transducer, the transducer to which a frequency signal is applied friction-driving the driven body; an original-signal outputting unit for outputting an original signal on which the frequency of the frequency signal depends; a waveform averaging unit for averaging the original signals during a predetermined period to calculate average-waveform data; a position detecting unit for detecting an absolute position of the driven body with respect to the transducer; a position averaging unit for averaging the absolute positions during a predetermined period to calculate average-position data; a control-signal calculating unit that generates a control signal for controlling the frequency of the original signal based on the average-waveform data and the average-position data and supplies the generated control signal to the original-signal outputting unit; and a driving unit for generating the frequency signal based on the original signal and applying the generated frequency signal to the transducer.

These objects and advantages of the present invention will become further apparent from the following detailed explanation.

DESCRIPTION OF THE PREFERRED EMBODIMENTS

Embodiments of the present invention will be described below with reference to the drawings.

First Embodiment (Structure)

Figure 1:
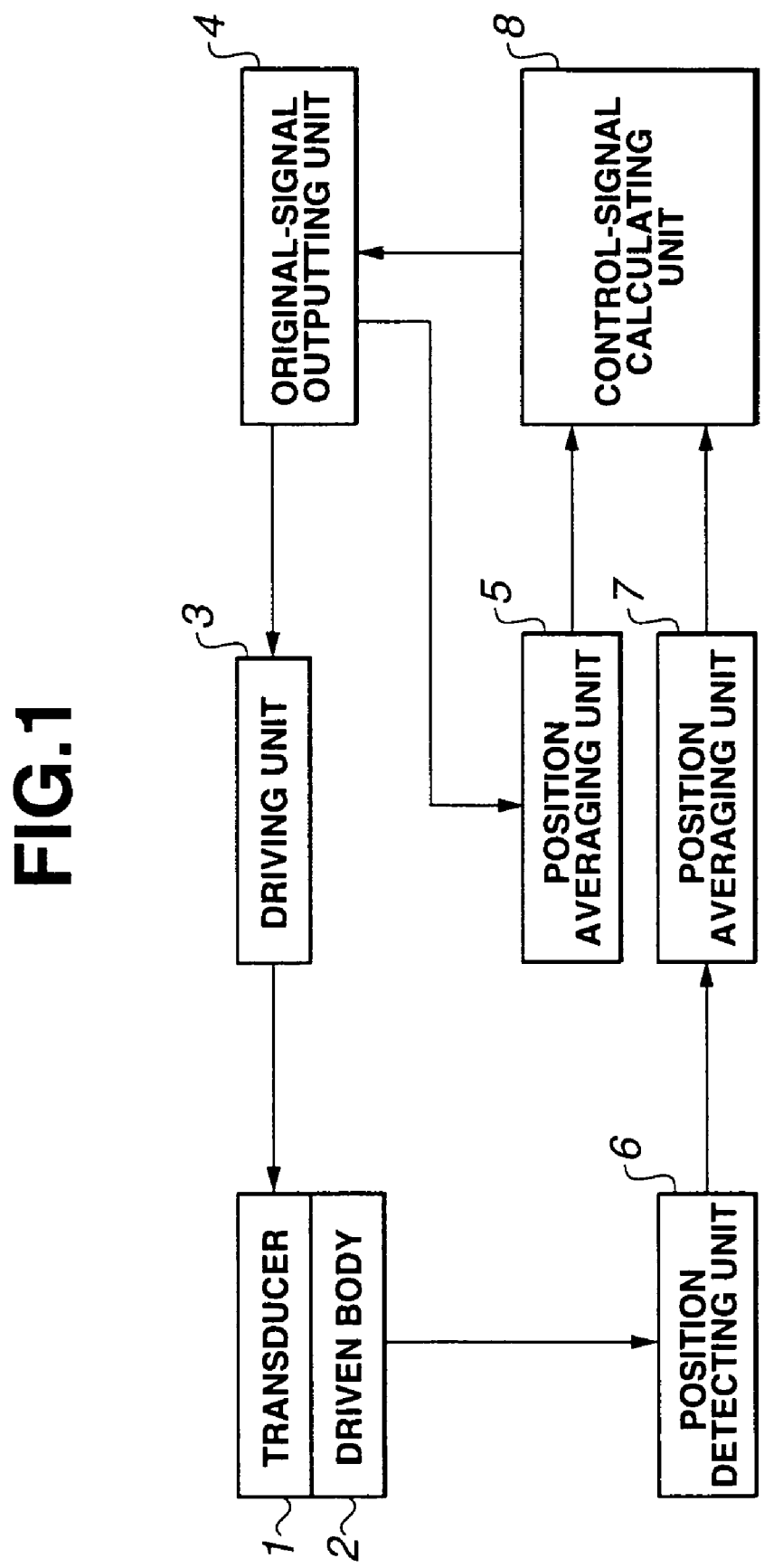
FIG. 1 is a block diagram showing the entire structure of an ultrasonic-actuator driving apparatus according to a first embodiment of the present invention.

FIG. 1 is a block diagram showing the structure of a driving apparatus for an ultrasonic actuator (hereinafter referred to as an ultrasonic-actuator driving apparatus) according to a first embodiment of the present invention.

Referring to FIG. 1, the ultrasonic-actuator driving apparatus of the first embodiment includes a transducer 1 and a driven body 2 in the ultrasonic actuator, a driving unit 3, an original-signal outputting unit 4, a waveform averaging unit 5, a position detecting unit 6, a position averaging unit 7, and a control-signal calculating unit 8.

Specifically, the ultrasonic actuator in which the driven body 2, which is in contact with the transducer 1, is friction-driven is provided in the ultrasonic-actuator driving apparatus. The transducer 1 in the ultrasonic actuator is electrically connected to the driving unit 3, which applies frequency voltage to the transducer 1.

The driving unit 3 is electrically connected to the original-signal outputting unit 4, which supplies pulse signals, on which the frequency voltage depends, to the driving unit 3.

The original-signal outputting unit 4 is electrically connected to the waveform averaging unit 5 and the control-signal calculating unit 8. The driven body 2 is electrically connected to the position detecting unit 6 for detecting positions.

The position detecting unit 6 is electrically connected to the position averaging unit 7. The control-signal calculating unit 8 is electrically connected to the waveform averaging unit 5, the position averaging unit 7, and the original-signal outputting unit 4.

(Operation)

In the ultrasonic-actuator driving apparatus having the structure described above, the driving unit 3 receives an original signal from the original-signal outputting unit 4 to generate a rectangular-wave signal having a frequency of 50 KHz to 400 KHz, which is a resonant frequency of the transducer 1 in the ultrasonic-actuator, and a voltage of 4 V to 30 V, and supplies the generated rectangular-wave signal to the transducer 1.

According to the first embodiment, the rectangular-wave signal generated in the driving unit 3 optimally had, for example, a resonant frequency of 83 KHz and a driving voltage of 4.4 V. The application of such a rectangular-wave signal to the transducer 1 by the driving unit 3 friction-drives the driven body 2, which is in contact with the transducer 1.

In this case, the waveform averaging unit 5 averages the outputs from the original-signal outputting unit 4, and supplies the averaged result to the control-signal calculating unit 8. The position averaging unit 7 averages signals detected in the position detecting unit 6 for detecting the absolute position of the driven body 2, and supplies the averaged result to the control-signal calculating unit 8.

Thereafter, the control-signal calculating unit 8 determines the current state based on the averaged results supplied from the waveform averaging unit 5 and the position averaging unit 7 to generate a correction signal for stable positioning and driving, and sequentially feeds back the generated correction signal to the original-signal outputting unit 4.

Although the rectangular-wave signal is applied to the transducer 1 in the first embodiment, the signal applied to the transducer 1 is not limited to the rectangular-wave signal and may be a sinusoidal signal or a sawtooth signal.

(Advantages)

As described above, according to the first embodiment, the ultrasonic-actuator driving apparatus is structured such that the control-signal calculating unit 8 determines the current state based on the averaged results supplied from the waveform averaging unit 5 and the position averaging unit 7 to generate the correction signal for stable positioning and driving and sequentially feeds back the generated correction signal to the original-signal outputting unit 4. Hence, even when a movement state or a velocity is varied, that is, even when the movement state is varied because of the variation in temperature, humidity, and/or load or a resonant frequency is accidentally varied, it is possible to achieve high-precision and stable positioning.

In addition, a sharp change in response characteristics relating to waveform data, which possibly occurs when the movement state or the resonant frequency is varied, or relating to position data can advantageously be moderated.

Furthermore, it is possible to control a starting position of deceleration of the driven body 2 in accordance with a sharp change in response characteristics, which possibly occurs when the movement state is varied because of the variation in temperature, humidity, and/or load or the resonant frequency is varied, and to control the frequency of the original signal in accordance with the controlled starting position of deceleration.

Second Embodiment (Structure)

Figure 2:
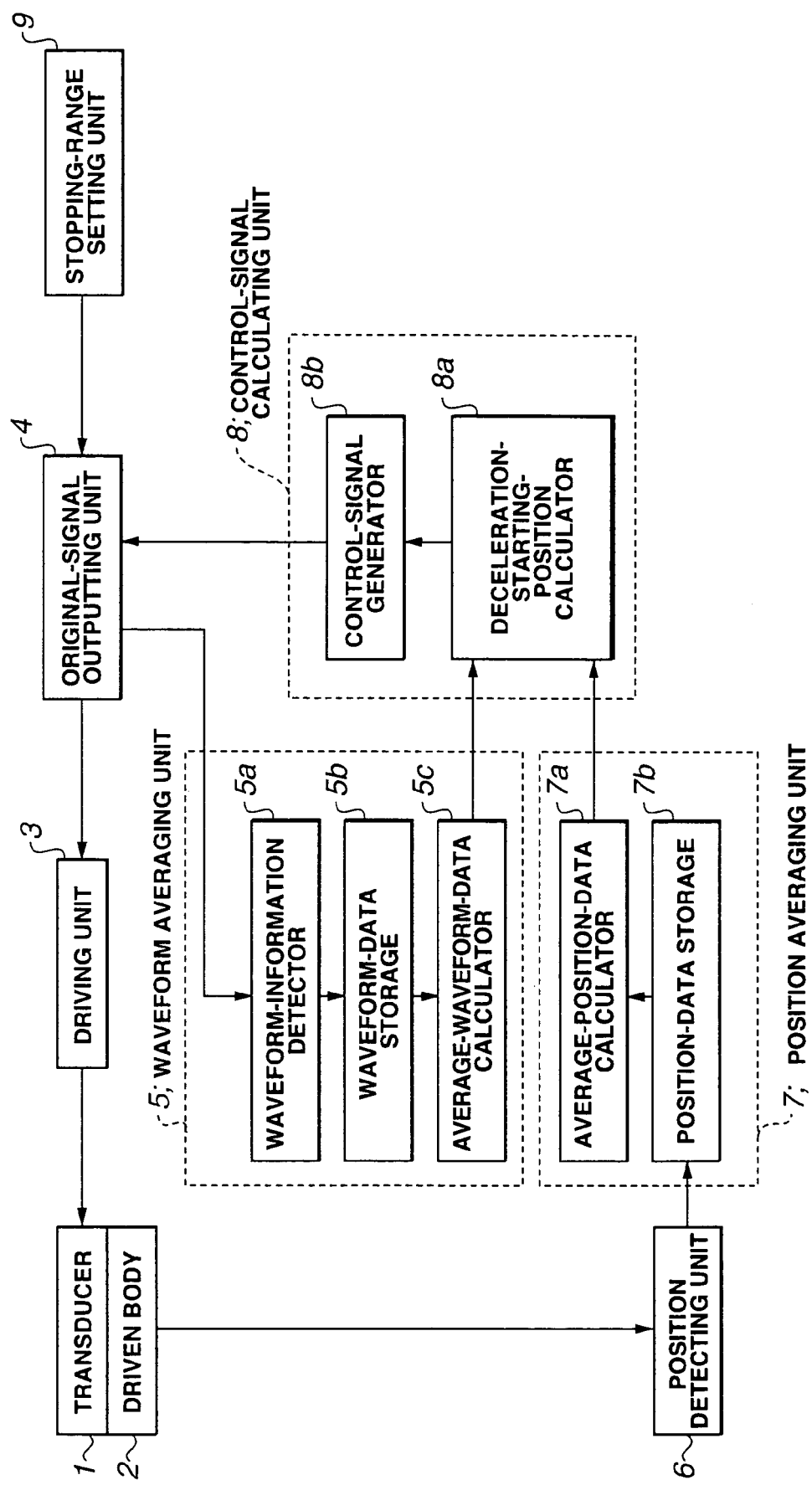
FIG. 2 is a block diagram showing the entire structure of an ultrasonic-actuator driving apparatus according to a second embodiment of the present invention.

FIG. 2 is a block diagram showing the structure of an ultrasonic-actuator driving apparatus according to a second embodiment of the present invention. The same reference numerals are used in FIG. 2 to identify the same components as in the ultrasonic-actuator driving apparatus of the first embodiment. The description of such components is omitted here and only the components different from those in the ultrasonic-actuator driving apparatus of the first embodiment will be described.

The ultrasonic-actuator driving apparatus of the second embodiment differs from the ultrasonic-actuator driving apparatus of the first embodiment in that the waveform averaging unit 5, the position averaging unit 7, and the control-signal calculating unit 8 are each divided into units and that the ultrasonic-actuator driving apparatus further includes a stopping-range setting unit 9, in order to achieve drive control for higher-precision and stable positioning.

Referring to FIG. 2, the waveform averaging unit 5 includes a waveform-information detector 5a, a waveform-data storage 5b, and an average-waveform-data calculator 5c.

The position averaging unit 7 includes an average-position-data calculator 7a and a position-data storage 7b.

The control-signal calculating unit 8 includes a deceleration-starting-position calculator 8a and a control-signal generator 8b.

Specifically, in the waveform averaging unit 5, the waveform-information detector 5a is electrically connected to the original-signal outputting unit 4 and the waveform-data storage 5b. The average-waveform-data calculator 5c is electrically connected to the waveform-data storage 5b and the deceleration-starting-position calculator 8a.

The waveform-information detector 5a samples original rectangular-wave signals supplied from the original-signal outputting unit 4 during a predetermined sampling period to acquire waveform information output during the sampling period, and supplies the waveform information to the waveform-data storage 5b.

The waveform-data storage 5b stores pieces of the waveform information acquired in the sampling by the waveform-information detector 5a one by one.

The average-waveform-data calculator 5c averages the waveform data stored in the waveform-data storage 5b, and supplies the averaged result to the deceleration-starting-position calculator 8a in the control-signal calculating unit 8.

Meanwhile, in the position averaging unit 7, the position-data storage 7b is electrically connected to the position detecting unit 6 and the average-position-data calculator 7a.

The position-data storage 7b receives moving distance sampled during a predetermined sampling period in the position detecting unit 6, and stores the moving distance, in the same way as in the waveform-data storage 5b.

The average-position-data calculator 7a averages the position data stored in the position-data storage 7b, and supplies the averaged result to the deceleration-starting-position calculator 8a in the control-signal calculating unit 8.

In the control-signal calculating unit 8, the deceleration-starting-position calculator 8a is electrically connected to the average-waveform-data calculator 5c, the average-position-data calculator 7a, and the control-signal generator 8b.

The deceleration-starting-position calculator 8a calculates a starting position of deceleration of the driven body 2 by using the averaged results, that is, average-position data and average-waveform data, and supplies the calculated position to the control-signal generator 8b.

The control-signal generator 8b controls the frequency of the original signal output from the original-signal outputting unit 4, based on the result calculated by the deceleration-starting-position calculator 8a.

The stopping-range setting unit 9 is electrically connected to the original-signal outputting unit 4. The stopping-range setting unit 9 sets a stopping range of the driven body 2, and supplies a stop signal to the original-signal outputting unit 4, when the absolute position of the driven body 2 is within the stopping range, to cause the original-signal outputting unit 4 to stop outputting the original signal.

Other structures are the same as in the first embodiment.

(Operation)

When the ultrasonic-actuator driving apparatus in FIG. 2 is driven, it operates approximately the same as in the ultrasonic-actuator driving apparatus of the first embodiment. However, according to the second embodiment, the waveform-information detector 5a samples the original rectangular-wave signals supplied from the original-signal outputting unit 4 during a sampling period of, for example, 5 to 200 milliseconds to acquire waveform information output during the sampling period. The waveform-information detector 5a sampled the original rectangular-wave signals during a sampling period of 30 milliseconds in the second embodiment.

The waveform-data storage 5b stores pieces of the waveform information acquired during a sampling period of 30 milliseconds by the waveform-information detector 5a one by one. The number of pieces of the stored waveform information is 2 to 100. Thirty pieces of the waveform information was stored in the second embodiment.

Thereafter, the average-waveform-data calculator 5c averages the waveform data stored in the waveform-data storage 5b, and supplies the averaged result to the deceleration-starting-position calculator 8a.

The position detecting unit 6 supplies a moving distance sampled during a sampling period of, for example, 30 milliseconds to the position-data storage 7b.

And then, the position-data storage 7b stores 2 to 100 pieces of the position information, in the same way as in the waveform-data storage 5b. Thirty pieces of the position data sampled in the position detecting unit 6 was stored in the second embodiment.

After that, the average-position-data calculator 7a averages the position data stored in the position-data storage 7b, and supplies the averaged result to the deceleration-starting-position calculator 8a.

Thereafter, in the control-signal calculating unit 8, the deceleration-starting-position calculator 8a calculates a starting position of deceleration of the driven body 2 by using the average-position data and the average-waveform data based on the amount of movement per one pulse during the sampling or the like, and supplies the calculated position to the control-signal generator 8b.

And then, the control-signal generator 8b controls the frequency of the original signal output from the original-signal outputting unit 4, based on the result calculated by the deceleration-starting-position calculator 8a. The stopping-range setting unit 9 sets a stopping range of the driven body 2, and supplies a stop signal to the original-signal outputting unit 4, when the absolute position of the driven body 2 is within the stopping range, to cause the original-signal outputting unit 4 to stop outputting the original signal.

Other operations are the same as in the first embodiment.

Although the number of pieces of the waveform data and position data stored in the waveform-data storage 5b and the position-data storage 7b, respectively, was set to 30 in the second embodiment, it is not limited to this figure and may be varied in accordance with the ultrasonic-actuator. Also, although the sampling period was set to 30 milliseconds in the second embodiment, it is not limited to this figure and may be varied in accordance with the ultrasonic actuator.

(Advantages)

Accordingly, the ultrasonic-actuator driving apparatus of the second embodiment has the advantage of being capable of performing high-precision positioning with respect to a target stopping position by setting the range of the target stopping position to an integral multiple of resolution in the position detecting unit 6 in the positive and negative directions, in addition to the same advantages as in the first embodiment. It is further possible to stably drive the ultrasonic actuator.

Third Embodiment (Structure)

Figure 3:
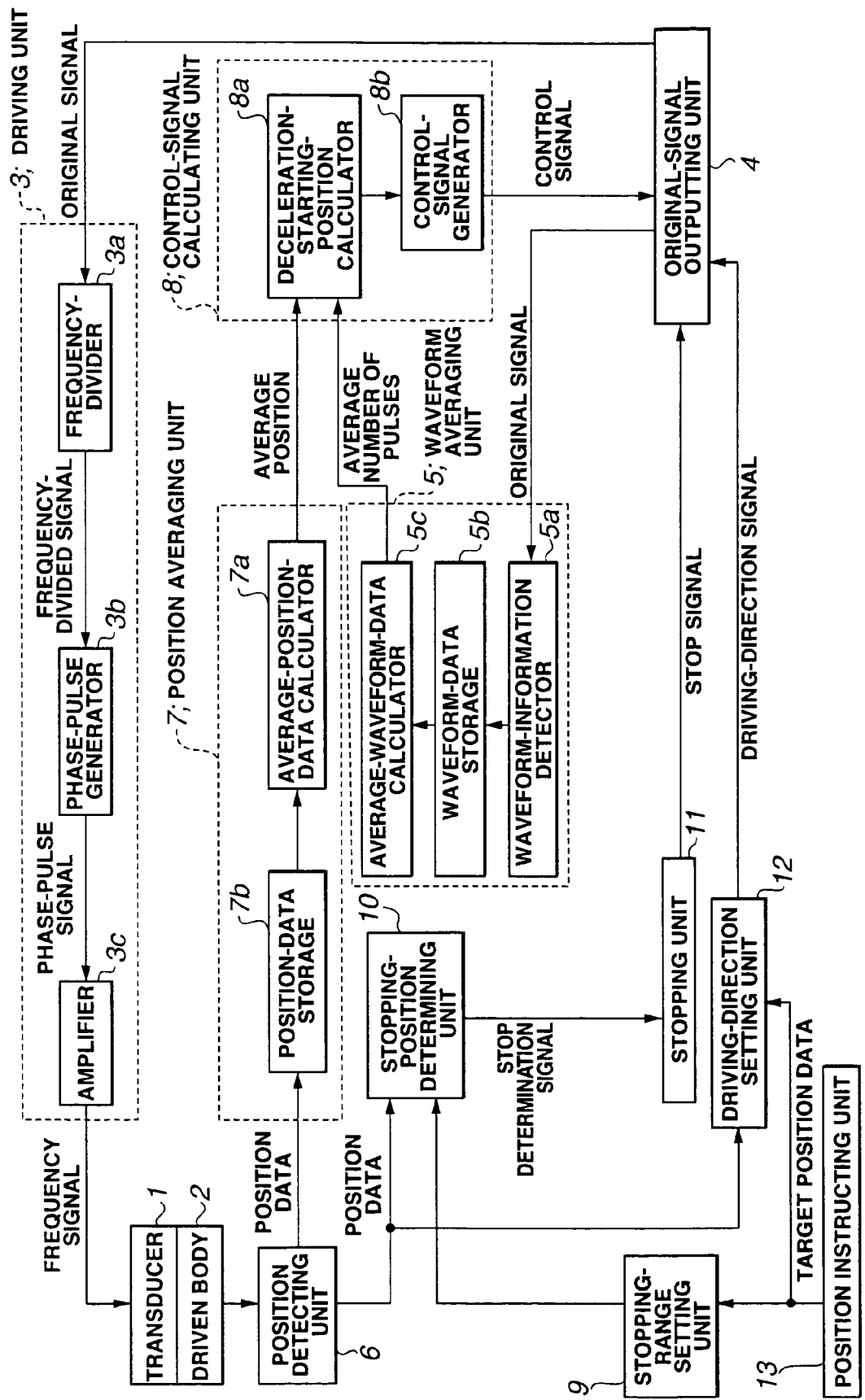
FIG. 3 is a block diagram showing the entire structure of an ultrasonic-actuator driving apparatus according to a third embodiment of the present invention.
Figure 4A:
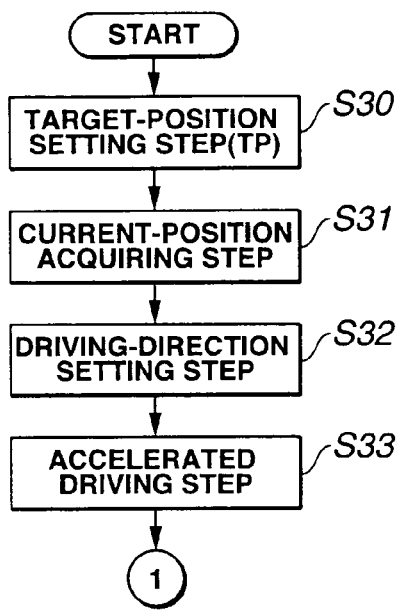
FIG. 4A illustrates an ultrasonic-actuator driving method, according to the third embodiment of the present invention, applied to the ultrasonic-actuator driving apparatus in FIG. 3, and is a flowchart showing a main initial-setting processing routine.
Figure 4C:
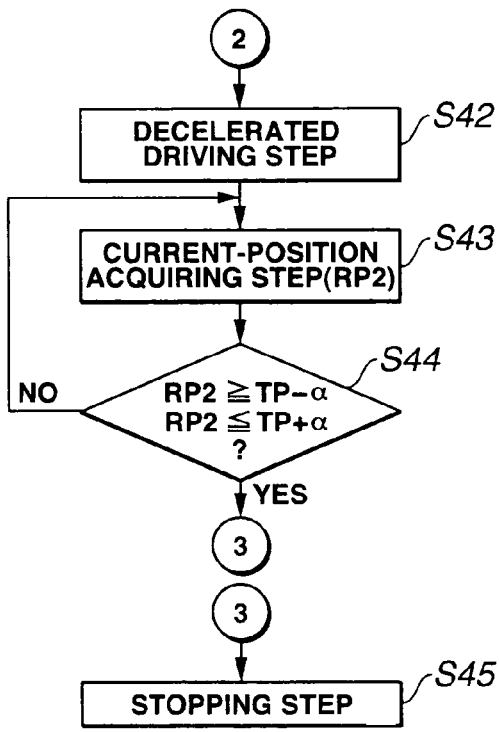
FIG. 4C is a flowchart showing a stop processing routine.
Figure 4B:
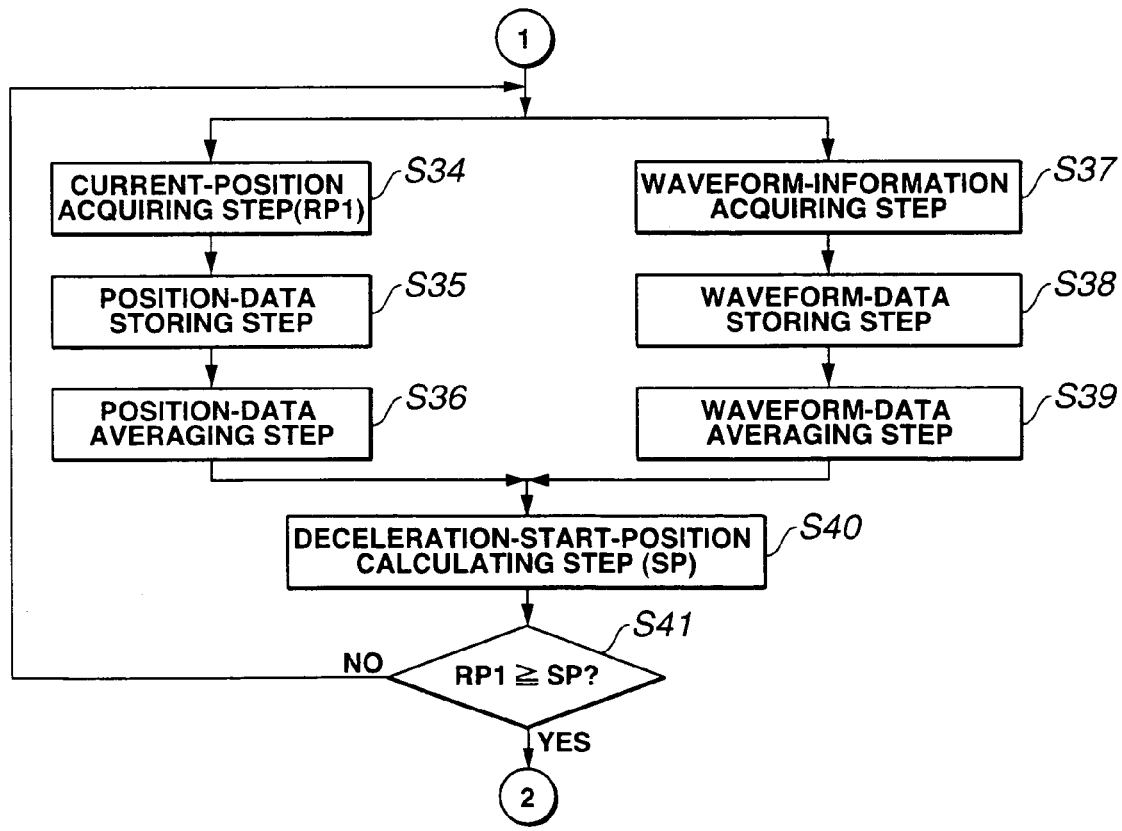
FIG. 4B is a flowchart showing a control processing routine.

FIG. 3 is a block diagram showing the structure of an ultrasonic-actuator driving apparatus according to a third embodiment of the present invention. FIGS. 4A to 4C are flowcharts illustrating an ultrasonic-actuator driving method, according to the third embodiment of the present invention, applied to the ultrasonic-actuator driving apparatus in FIG. 3; FIG. 4A shows a main initial-setting processing routine, FIG. 4B shows a control processing routine, and FIG. 4C shows a stop processing routine. The same reference numerals are used in FIG. 3 to identify the same components as in the ultrasonic-actuator driving apparatuses of the first and second embodiments. The description of such components is omitted here and only the components different from those in the ultrasonic-actuator driving apparatuses of the first and second embodiments will be described.

The ultrasonic-actuator driving apparatus of the third embodiment is characterized in that the driving unit 3 is divided into a frequency-divider 3a, a phase-pulse generator 3b, and an amplifier 3c, and is characterized by including a stopping-position determining unit 10, a stopping unit 11, a driving-direction setting unit 12, and a position instructing unit 13, in addition to the components in the second embodiment, in order to achieve drive control for further higher-precision and stable positioning.

Referring to FIG. 3, the driving unit 3 is divided in to the frequency-divider 3a, the phase-pulse generator 3b, and the amplifier 3c.

The frequency-divider 3a is electrically connected to the phase-pulse generator 3b and the original-signal outputting unit 4. The amplifier 3c is electrically connected to the phase-pulse generator 3b and the transducer 1.

The frequency-divider 3a divides the frequency of an original signal supplied from the original-signal outputting unit 4, and supplies the frequency-divided signal to the phase-pulse generator 3b. The phase-pulse generator 3b generates a phase-pulse signal from the supplied frequency-divided signal, and supplies the generated phase-pulse signal to the amplifier 3c. The amplifier 3c amplifies the supplied phase-pulse signal at a predetermined amplification factor, and supplies the amplified signal to the transducer 1 as a driving signal.

Meanwhile, the position detecting unit 6, which is, for example, a linear scale, is electrically connected to the driven body 2, the position-data storage 7b, the stopping-position determining unit 10, and the driving-direction setting unit 12.

The position instructing unit 13 is electrically connected to the stopping-range setting unit 9 and the driving-direction setting unit 12. The stopping-position determining unit 10 is electrically connected to the position detecting unit 6, the stopping-range setting unit 9, and the stopping unit 11.

The original-signal outputting unit 4 is electrically connected to the stopping unit 11, the driving-direction setting unit 12, the waveform-information detector 5a, the control-signal generator 8b, and the frequency-divider 3a.

The position instructing unit 13, for example, a keyboard, which is an externally-attached input device of a computer, is a unit for inputting instruction information for instructing a target position (referred to as target-position data), and supplies the target-position data to the stopping-range setting unit 9 and the driving-direction setting unit 12.

The stopping-range setting unit 9 sets a predetermined range for the supplied target-position data as a target stopping-position range, and supplies the set stopping-position range data to the stopping-position determining unit 10.

The stopping-position determining unit 10 determines a stopping position based on the position data supplied from the position detecting unit 6 and the stopping-position range data supplied from the stopping-range setting unit 9, and supplies the determined result, that is, a stop determination signal, to the stopping unit 11.

The stopping unit 11 limits the output from the original-signal outputting unit 4 based on the supplied stop determination signal.

The driving-direction setting unit 12 decides a driving direction based on the position data supplied from the position detecting unit 6 and the target-position data supplied from the position instructing unit 13, and supplies a driving-direction signal indicating the driving direction to the original-signal outputting unit 4.

Other structures are the same as in the first and second embodiments.

(Operation)

Next, an ultrasonic-actuator driving method, according to the third embodiment of the present invention, using the ultrasonic-actuator driving apparatus will now be described in detail with reference to FIGS. 4A to 4C.

The ultrasonic-actuator driving apparatus shown in FIG. 3 is driven. In the ultrasonic-actuator driving apparatus of the third embodiment, a target position is input with the position instructing unit 13 in FIG. 3, for example, a keyboard, which is an externally-attached input device of a computer.

A controlling unit (not shown) for performing various controls of the overall ultrasonic-actuator driving apparatus in FIG. 3 (the controlling unit including a control-signal calculator) invokes an initial-setting processing routine shown in FIG. 4A. Namely, in Step S30, the controlling unit reads the input target position.

And then, the controlling unit sets a dead band within a range of ±0.1 μm for the read target position to set a target stopping-position range, and proceeds to Step S31.

In Step S31, the controlling unit causes the stopping-range setting unit 9 to acquire the current position of the ultrasonic actuator from a signal detected by the position detecting unit 6 (linear scale).

After the current position is acquired, in Step S32, the controlling unit causes the driving-direction setting unit 12 to set a driving direction based on the deviation of the current position from the target position.

After the driving direction is decided, in Step S33, the controlling unit causes the original-signal outputting unit 4 and the driving unit 3 to perform acceleration drive at a predetermined acceleration constant based on the decided driving direction. In this case, when the acceleration drive reaches a maximum speed that can be arbitrarily set in a range from 1,000 pps (pulse per second) to 15,000 pps, the controlling unit causes the original-signal outputting unit 4 and the driving unit 3 to perform constant-speed drive at the maximum speed. According to the third embodiment, the maximum speed was set to 3,000 pps.

After the acceleration drive is performed in Step S33, the controlling unit proceeds to Step S34 shown in FIG. 4B. In Step S34, the controlling unit acquires position data during a sampling period of 5 to 200 milliseconds from the signals detected by the position detecting unit 6 (linear scale), and determines the deviation of the acquired position data from the preceding sampled value. In Step S35, the controlling unit stores the position data in the position-data storage 7b.

In this case, the sampling period was set to 30 milliseconds here in the third embodiment. In the step of storing the position data in Step S35, since there is no previous sampled value for the first stored position data, the deviation of the first stored position data from zero is determined for storage.

And then, in Step S36, the controlling unit causes the average-position-data calculator 7a to average the stored position data based on the number of pieces of the position data. In Step S35 in the third embodiment, the position data is stored in 30 arrays. In other words, since one piece of the position data exists in the first averaging operation, the averaging cannot be performed, thus supplying the position data without being averaged to the deceleration-starting-position calculator 8a in the control-signal calculating unit 8. In the subsequent sampling, as described above, the controlling unit determines the deviation of the new position data sampled in Step S34 from the position data stored in the position-data storage 7b in Step S35, and stores the position data to the position-data storage 7b in Step S35.

Hence, in Step S35, new data takes priority over old data and two pieces of the position data are stored in the position-data storage 7b.

In Step S36, the controlling unit causes the average-position-data calculator 7a to average the two pieces of the position data and to supply the averaged result to the deceleration-starting-position calculator 8a. As described above, the controlling unit repeats the above steps to determine average-position data.

Further, if the number of pieces of the position data is larger than or equal to 30, the controlling unit discards the position data that has been first stored in the position-data storage 7b in Step S35 from the 30 arrays, and stores the latest position data in the position-data storage 7b. In this state, the average-position-data calculator 7a averages the 30 pieces of the position data based on the number of pieces of the position data in Step S36.

Similarly to the case of the position data, after the acceleration drive is performed in Step S33, the controlling unit calculates average-waveform data of the original signal in Steps S37 to S39, concurrently with the Steps S34 to S36. Namely, the controlling unit causes the waveform-information detector 5a to acquire waveform information of the original signal in Step S37.

In Step S38, the controlling unit stores the acquired waveform data in the waveform-data storage 5b.

In Step S39, the controlling unit causes the average-waveform-data calculator 5c to average the waveform data based on the number of pieces of the waveform data stored in the waveform-data storage 5b in Step S38, and supplies the averaged result (the average number of pulses) to the deceleration-starting-position calculator 8a.

In Step S38 in the third embodiment, 30 arrays in which the waveform data is stored are provided, as in the step of storing the position data (Step S35). The process performed when 30 or more pieces of the waveform data have been supplied is the same as in the Step S35.

Specifically, the average-position data P averaged in Step S36 and the average-waveform data W averaged in Step S39 are supplied to the deceleration-starting-position calculator 8a at intervals of 30 milliseconds.

And then, in Step S40, the controlling unit causes the deceleration-starting-position calculator 8a to calculate a starting position of deceleration based on the following equation (Formula 1), where P denotes the average-position data, W denotes the average-waveform data, Sa denotes a sampling rate, Ve denotes a speed set as a reference speed, and d denotes a division ratio of the frequency-divider 3a.

Deceleration starting position=$(1/Ve) \times Sa \times d \times P \times (W/P)$  [Formula 1]

Thereafter, in Step S41, the controlling unit compares the starting position of deceleration SP calculated in Step S40 with the current position RP1 acquired in Step S34 to determine whether a relationship of SP≦RP1 is established.

In this case, if the controlling unit determines that the relationship is not established, the process returns back to Step S34 and Step S37. In the meantime, if the controlling unit determines that the relationship is established, in Step S42, the controlling unit causes the original-signal outputting unit 4 and the driving unit 3 to perform deceleration drive at a predetermined deceleration constant. In this case, when the deceleration drive reaches a minimum speed that can be arbitrarily set in a range from 10 pps to 1,000 pps, the controlling unit causes the original-signal outputting unit 4 and the driving unit 3 to perform constant-speed drive at the minimum speed. According to the third embodiment, the minimum speed was set to 20 pps.

After the deceleration drive is performed, in Step S43, the controlling unit acquires the current position RP2. In the determination step in Step S44, the controlling unit causes the stopping-position determining unit 10 to determine whether the current position RP2 is within the target stopping-position range set in Step S30. If the controlling unit determines that the current position RP2 is within the target stopping-position range, in Step S45, the controlling unit causes the stopping unit 11 to stop outputting the original signal from the original-signal outputting unit 4. If the controlling unit determines that the current position RP2 is not within the target stopping-position range, the process returns back to Step S43 and repeats the process until the current position RP2 enters the target stopping-position range in Step S44.

Although the dead band is set within a range of ±0.1 μm from the target position in the third embodiment, the dead band is not limited to this figure. The dead band may be within a range from 0.1 μm to 10 μm in accordance with the ultrasonic actuator.

(Advantages)

Accordingly, the ultrasonic-actuator driving apparatus of the third embodiment has the advantages of being capable of stopping the ultrasonic actuator within the target stopping-position range with a high degree of precision, in addition to the advantages as in the first and second embodiments.

Fourth Embodiment (Structure)

Figure 5:
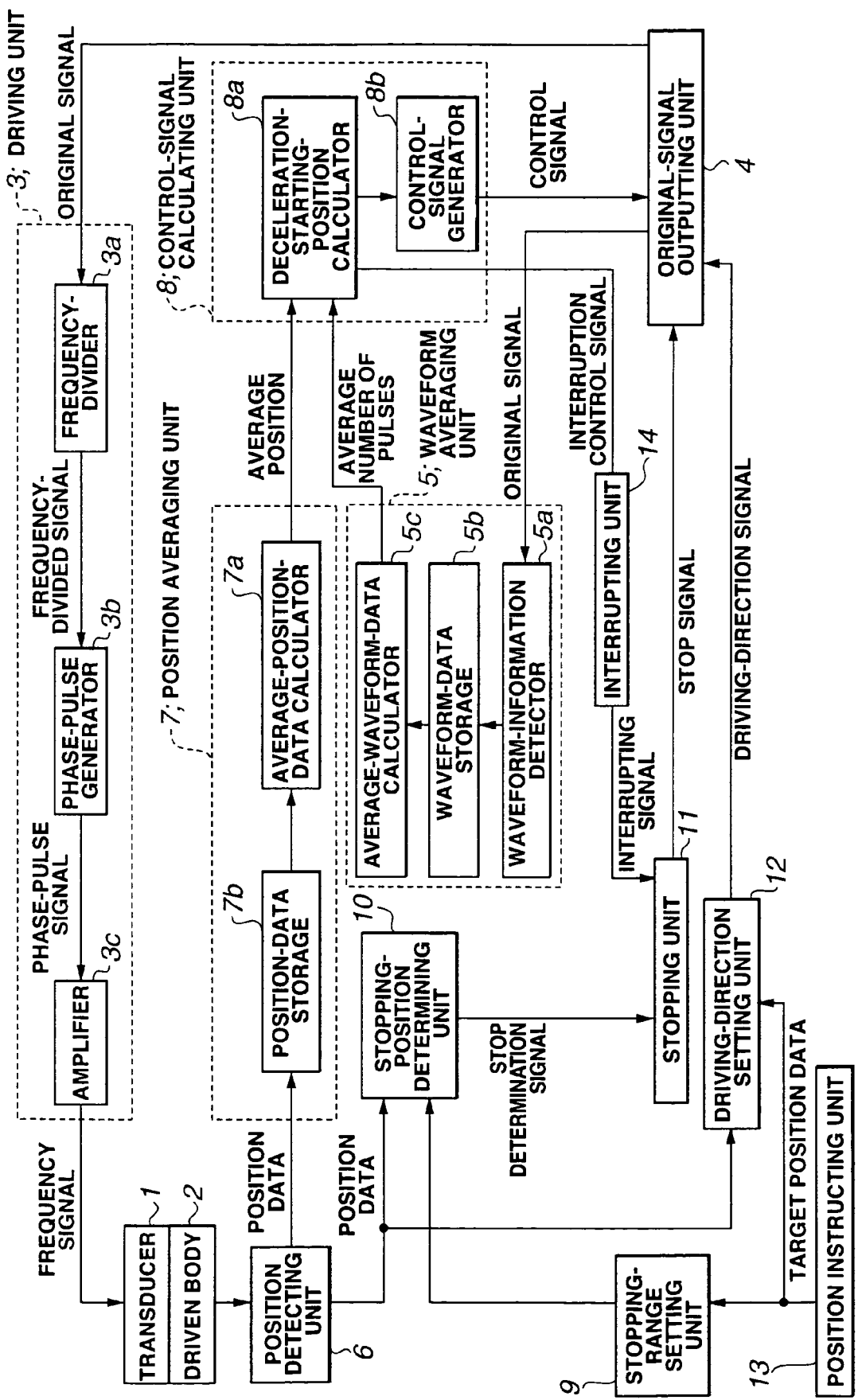
FIG. 5 is a block diagram showing the entire structure of an ultrasonic-actuator driving apparatus according to a fourth embodiment of the present invention.
Figure 6:
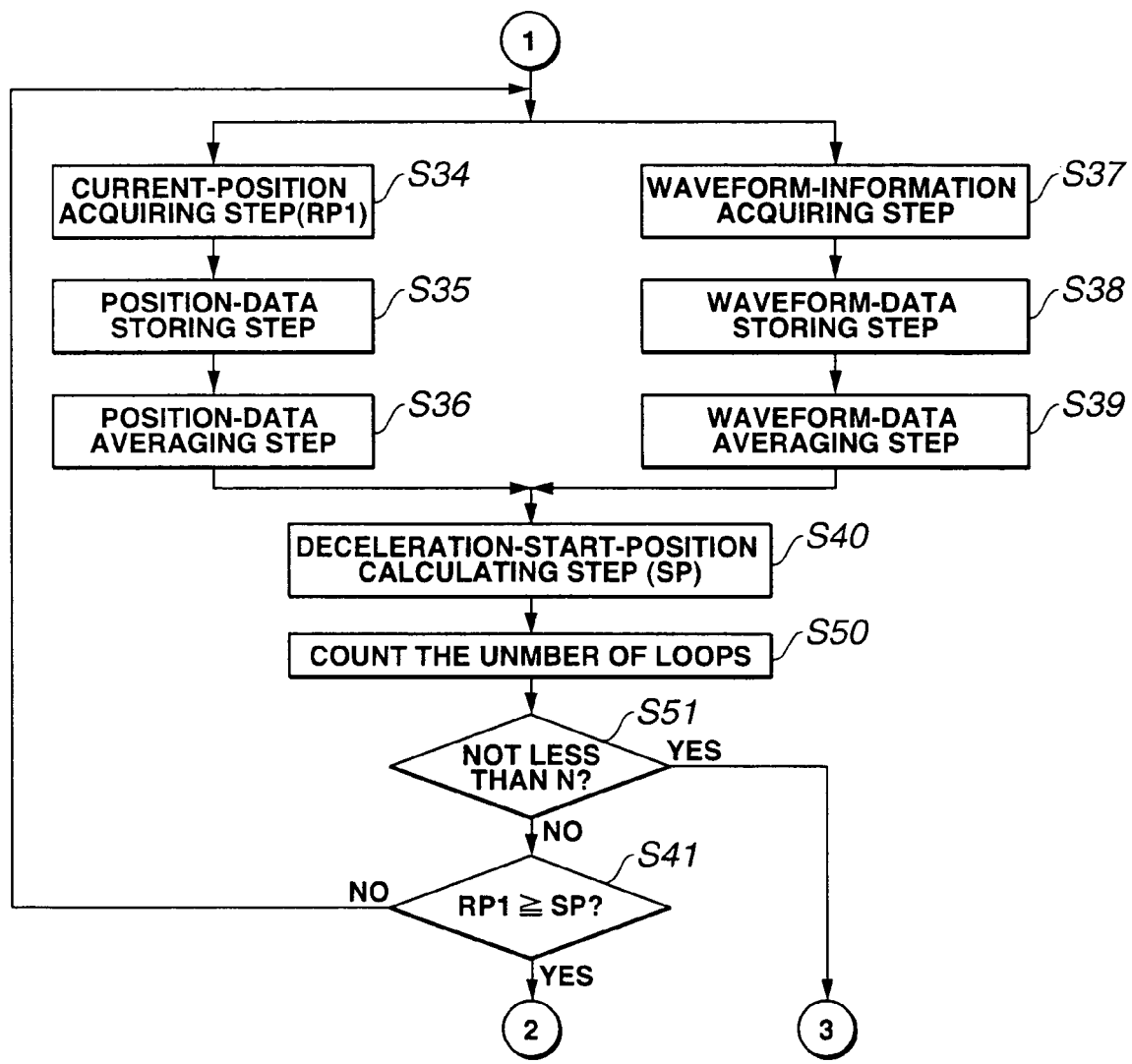
FIG. 6 is a flowchart illustrating an ultrasonic-actuator driving method, according to the fourth embodiment of the present invention, applied to the ultrasonic-actuator driving apparatus in FIG. 5.

FIG. 5 is a block diagram showing the structure of an ultrasonic-actuator driving apparatus according to a fourth embodiment of the present invention. FIG. 6 is a flowchart illustrating an ultrasonic-actuator driving method, according to the fourth embodiment of the present invention, applied to the ultrasonic-actuator driving apparatus in FIG. 5. The same reference numerals and step numbers are used in FIGS. 5 and 6 to identify the same components and processing routines as in the ultrasonic-actuator driving apparatuses and the ultrasonic-actuator driving method of the first to third embodiments. The description of such components and processing routines is omitted here and only the components and processing routines different from those in the ultrasonic-actuator driving apparatuses and the ultrasonic-actuator driving method of the first to third embodiments will be described.

The ultrasonic-actuator driving apparatus of the fourth embodiment is characterized by including an interrupting unit 14, which is electrically connected between the deceleration-starting-position calculator 8a and the stopping unit 11, in addition to the components in the third embodiment, as shown in FIG. 5.

Other structures are approximately the same as in the third embodiment.

In the ultrasonic-actuator driving method of the fourth embodiment, the control processing routine in the third embodiment (refer to FIG. 4B) further includes a step of counting the number of times of calculating the starting position of deceleration in Step S50 and a determination step in Step S51.

(Operation)

The ultrasonic-actuator driving method of the fourth embodiment will now be described in detail with reference to FIG. 6.

Although the ultrasonic-actuator driving method of the fourth embodiment is approximately the same as in the control processing routine in FIG. 4B in the third embodiment, Steps S50 and S51 are added between the Steps S40 and S41, as described above.

Specifically, in Step S50, after the step of calculating the starting position of deceleration in Step S40, the controlling unit counts the number of times of calculating the starting position of deceleration with a counter (not shown) in the controlling unit. In Step S51, the controlling unit determines whether the value counted in Step S50 is larger than or equal to any value from 20 to 70. If the controlling unit determines that the counted value is larger than or equal to, for example, 50, which were set in the fourth embodiment, the controlling unit forcedly exits the positioning control routine and outputs an interruption control signal to the interrupting unit 14. Then, the controlling unit causes the interrupting unit 14 to supply an interrupting signal to the stopping unit 11 for performing the stopping step in Step S45 shown in FIG. 4C to stop outputting the original signal. Meanwhile, if the controlling unit determines that the counted value is less than 50, the controlling unit proceeds to the determination step in Step S41 to continue the control processing routine.

Other operations are the same as in the third embodiment.

(Advantages)

Accordingly, the ultrasonic-actuator driving apparatus of the fourth embodiment has, in addition to the advantages as in the third embodiment, the advantage of preventing thermal destruction or thermal damage of the ultrasonic actuator caused by malfunction of the ultrasonic actuator itself, which possibly occurs when the movement state is varied because of the variation in temperature, humidity, and/or load or the resonant frequency is varied. It is also possible to save electric power.

Fifth Embodiment (Structure)

Figure 7:
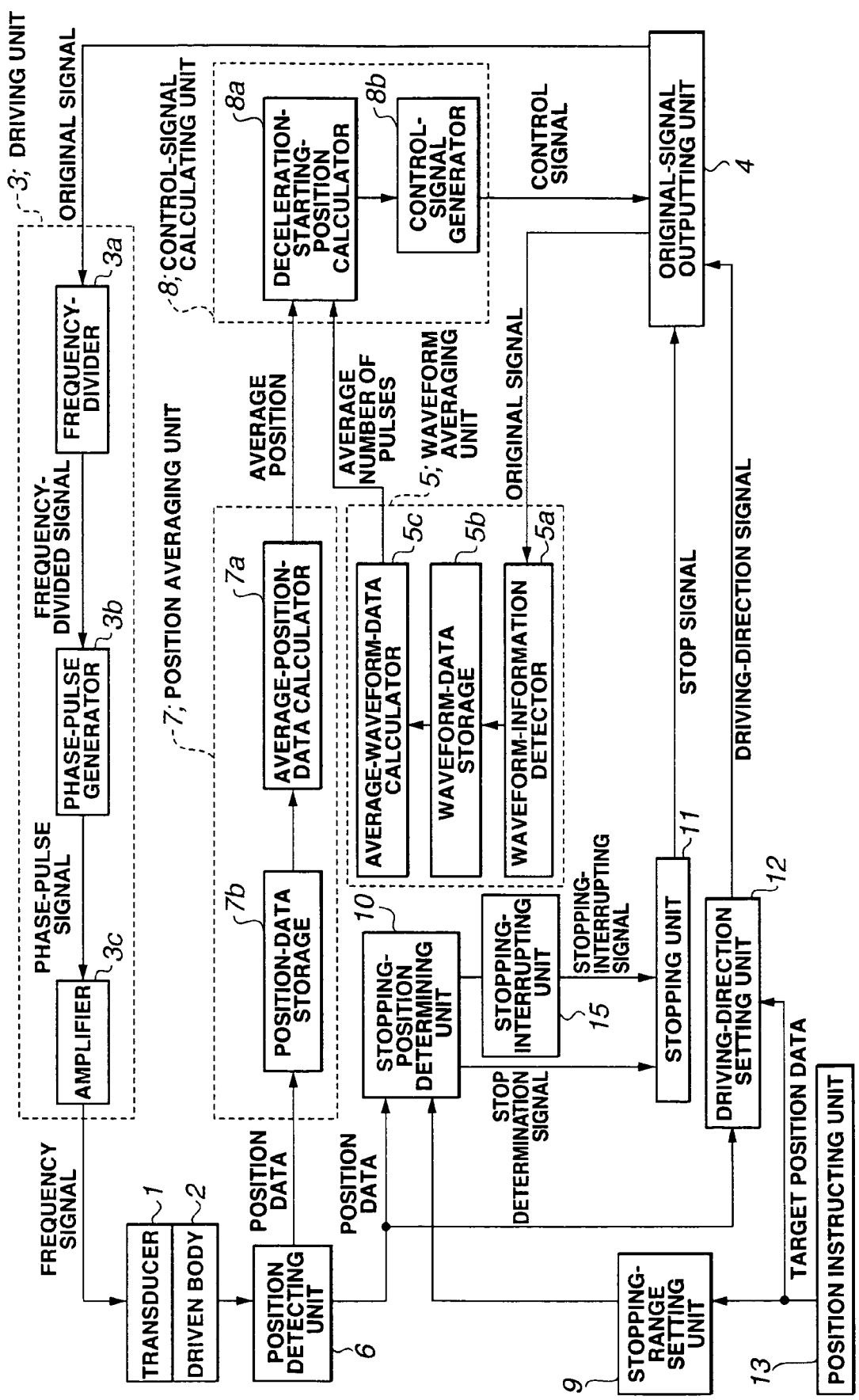
FIG. 7 is a block diagram showing the entire structure of an ultrasonic-actuator driving apparatus according to a fifth embodiment of the present invention.
Figure 8:
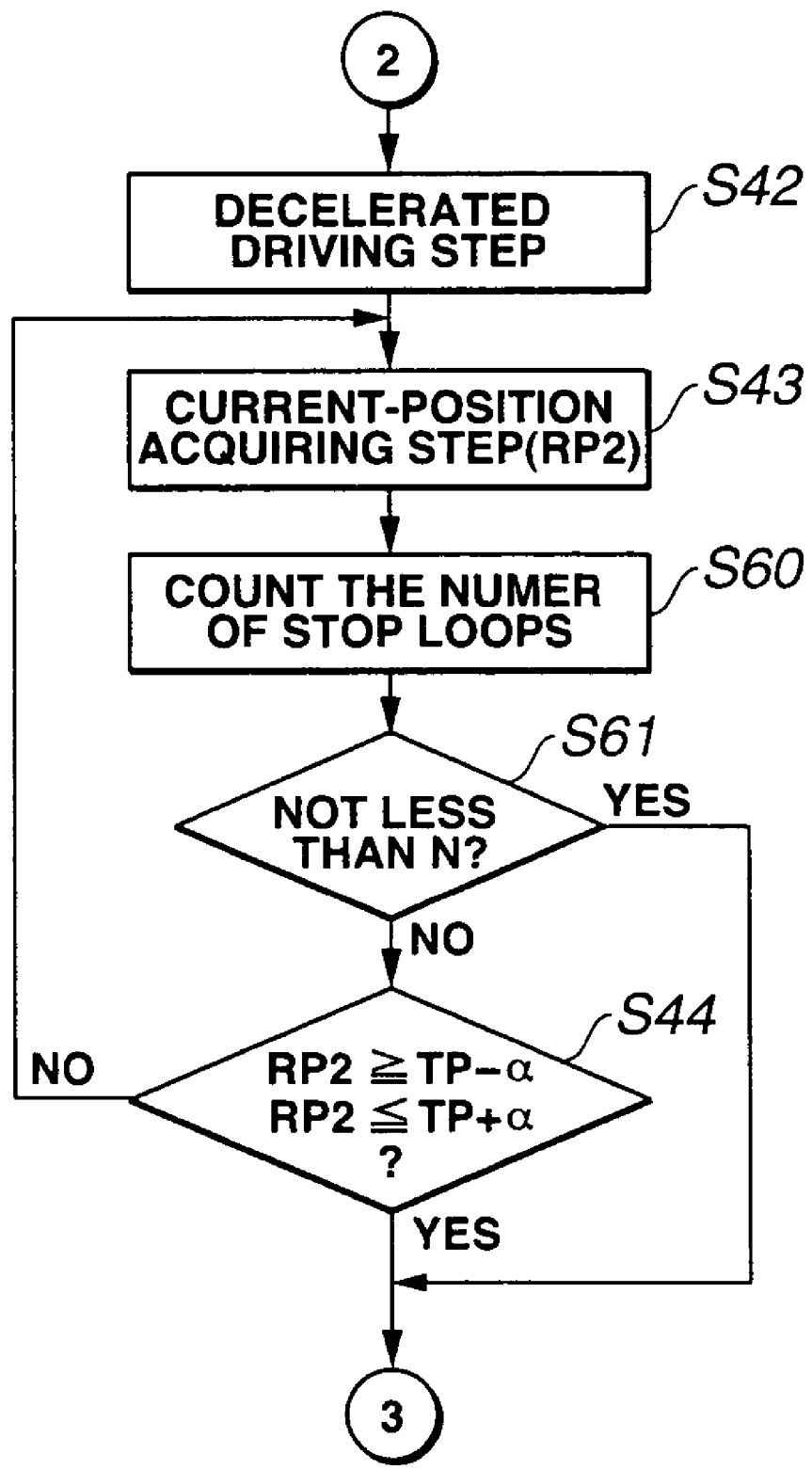
FIG. 8 is a flowchart illustrating an ultrasonic-actuator driving method, according to the fifth embodiment of the present invention, applied to the ultrasonic-actuator driving apparatus in FIG. 7.

FIG. 7 is a block diagram showing the structure of an ultrasonic-actuator driving apparatus according to a fifth embodiment of the present invention. FIG. 8 is a flowchart illustrating an ultrasonic-actuator driving method, according to the fifth embodiment of the present invention, applied to the ultrasonic-actuator driving apparatus in FIG. 7. The same reference numerals and step numbers are used in FIGS. 7 and 8 to identify the same components and processing routines as in the ultrasonic-actuator driving apparatuses and the ultrasonic-actuator driving method of the first to third embodiments. The description of such components and processing routines is omitted here and only the components and processing routines different from those in the ultrasonic-actuator driving apparatuses and the ultrasonic-actuator driving method of the first to third embodiments will be described.

The ultrasonic-actuator driving apparatus of the fifth embodiment is characterized by including a stopping-interrupting unit 15, which is electrically connected between the stopping-position determining unit 10 and the stopping unit 11, in addition to the components in the third embodiment, as shown in FIG. 7.

Other structures are approximately the same as in the third embodiment.

In the ultrasonic-actuator driving method of the fifth embodiment, the stop processing routine in the third embodiment (refer to FIG. 4C) further includes a step of counting the number of times of acquiring the current position in Step S60 and a determination step in Step S61.

(Operation)

The ultrasonic-actuator driving method of the fifth embodiment will now be described in detail with reference to FIG. 8.

Although the ultrasonic-actuator driving method of the fifth embodiment is approximately the same as in the stop processing routine in FIG. 4C in the third embodiment, Steps S60 and S61 are added between the Steps S43 and S44, as described above.

Specifically, in Step S60, after the step of acquiring the current position in Step S43, the controlling unit counts the number of times of acquiring the current position with a counter (not shown) in the controlling unit. In Step S61, the controlling unit determines whether the value counted in Step S60 is larger than or equal to any value from 20 to 50. If the controlling unit determines that the counted value is larger than or equal to, for example, 30, which were set in the fifth embodiment, the controlling unit forcedly exits the positioning control routine and causes the stopping-interrupting unit 15 to supply a stopping-interrupting signal to the stopping unit 11 for performing the stopping step in Step S45 shown in FIG. 4C to stop outputting the original signal. Meanwhile, if the controlling unit determines that the counted value is less than 30, the controlling unit proceeds to the step of acquiring the current position in Step S43 through Step S44 to continue the stop processing routine.

Other operations are the same as in the third embodiment.

(Advantages)

Accordingly, the ultrasonic-actuator driving apparatus of the fifth embodiment reliably achieves the same advantages as in the fourth embodiment.

Sixth Embodiment (Structure)

Figure 9:
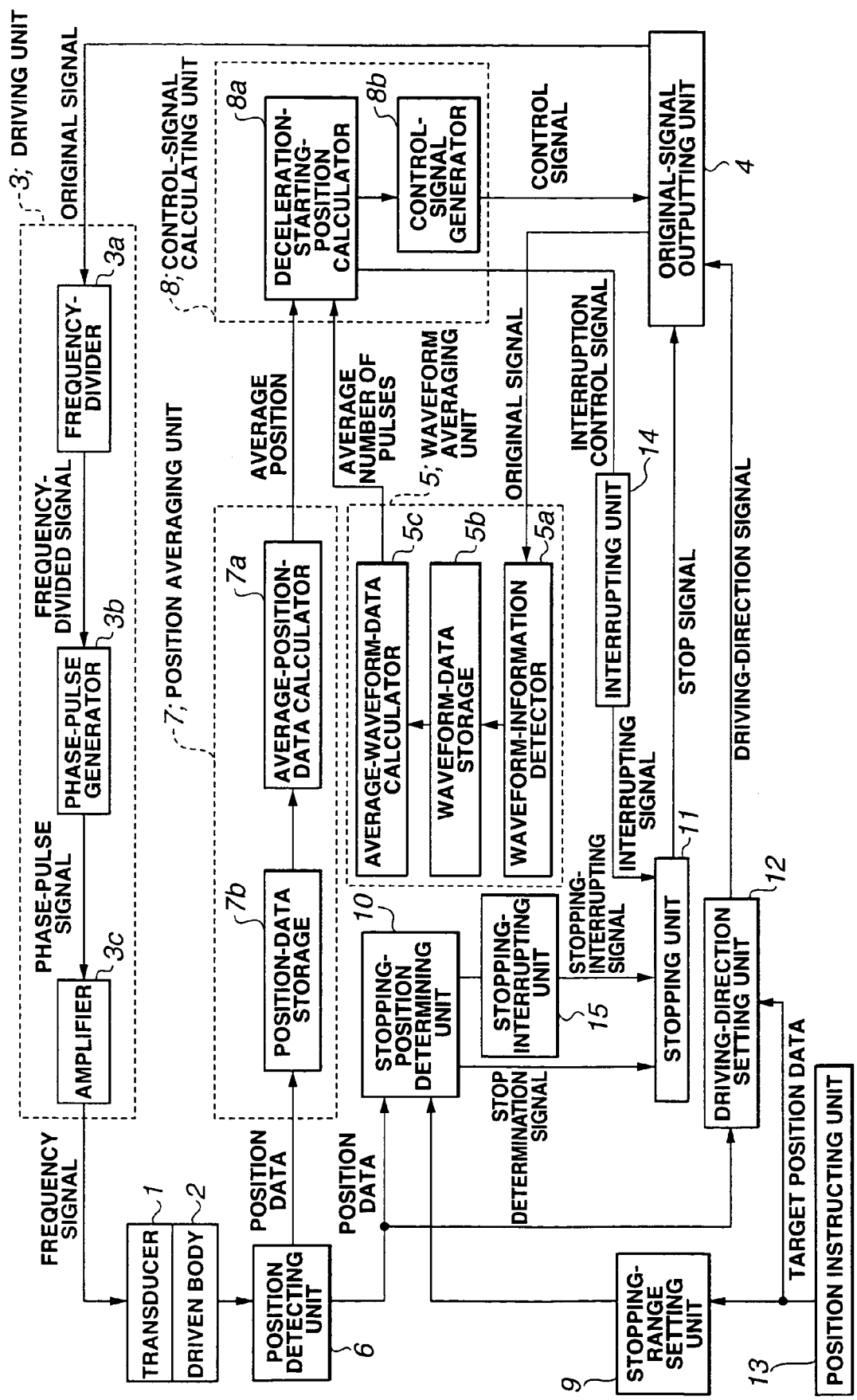
FIG. 9 is a block diagram showing the entire structure of an ultrasonic-actuator driving apparatus according to a sixth embodiment of the present invention.

FIG. 9 is a block diagram showing the structure of an ultrasonic-actuator driving apparatus according to a sixth embodiment of the present invention. The same reference numerals are used in FIG. 9 to identify the same components as in the ultrasonic-actuator driving apparatuses of the fourth and fifth embodiments. The description of such components is omitted here and only the components different from those in the ultrasonic-actuator driving apparatuses of the fourth and fifth embodiments will be described.

The ultrasonic-actuator driving apparatus of the sixth embodiment is characterized by combining the fourth embodiment with the fifth embodiment. Referring to FIG. 9, the ultrasonic-actuator driving apparatus of the sixth embodiment includes the interrupting unit 14, which is electrically connected between the deceleration-starting-position calculator 8a and the stopping unit 11, and the stopping-interrupting unit 15, which is electrically connected between the stopping-position determining unit 10 and the stopping unit 11. Other structures are approximately the same as in the third embodiment.

An ultrasonic-actuator driving method of the sixth embodiment includes the control processing routine of the fourth embodiment (refer to FIG. 6) combined with the stop processing routine of the fifth embodiment (refer to FIG. 8).

(Operation)

The ultrasonic-actuator driving method of the sixth embodiment will now be described in detail with reference to FIGS. 6 and 8.

Referring to FIG. 6, in Step S50, after the step of calculating the starting position of deceleration in Step S40, the controlling unit counts the number of times of calculating the starting position of deceleration with a counter (not shown) in the controlling unit. In Step S51, the controlling unit determines whether the value counted in Step S50 is larger than or equal to 50.

Referring to FIG. 8, in Step S60, after the step of acquiring the current position in Step S43, the controlling unit counts the number of times of acquiring the current position with the counter (not shown) in the controlling unit. In Step S61, the controlling unit determines whether the value counted in Step S60 is larger than or equal to 30.

According to the sixth embodiment, if the controlling unit determines in Step S51 and/or S61 that the value counted in Step S50 and/or S60 is larger than or equal to the set value, the controlling unit forcedly exits the positioning control routine, and performs the stopping step in Step S45 in FIG. 4C by controlling the stopping unit 11 through the interrupting unit 14 or the stopping-interrupting unit 15 to stop outputting the original signal. Meanwhile, if the controlling unit determines that the counted value is less than the set value in Step S51 and/or S61, the controlling unit continues the control processing routine, as in the fourth and fifth embodiments.

Other operations are the same as in the third embodiment.

(Advantages)

Accordingly, the ultrasonic-actuator driving apparatus of the sixth embodiment further reliably achieves the same advantages as in the fourth embodiment.

The present invention is not limited to the first to sixth embodiments. Combination or applications of the first to sixth embodiments can also be applied to the present invention within the scope of the present invention.

The present invention may be applied to an executive program for causing a computer to execute the ultrasonic-actuator driving method of the present invention. In addition, storing the executive program in a storage medium and reading out the executive program from the storage medium to execute the executive program by a computer that controls the ultrasonic-actuator driving apparatus may execute the ultrasonic-actuator driving method of the present invention.

In this invention, it is apparent that various modifications different in a wide range can be made on this basis of this invention without departing from the sprit and scope of the invention. This invention is not restricted by any specific embodiment except being limited by the appended claims.

What is claimed is:

1. An ultrasonic-actuator driving apparatus comprising:
an ultrasonic actuator including a transducer and a driven body that is in contact with the transducer, the transducer to which a frequency signal is applied friction-driving the driven body;
an original-signal outputting unit for outputting an original signal on which the frequency of the frequency signal depends;
a waveform averaging unit for averaging the original signals during a predetermined period to calculate average-waveform data;
a position detecting unit for detecting an absolute position of the driven body with respect to the transducer;
a position averaging unit for averaging the absolute positions during a predetermined period to calculate average-position data;
a control-signal calculating unit that generates a control signal for controlling the frequency of the original signal based on the average-waveform data and the average-position data and supplies the generated control signal to the original-signal outputting unit; and
a driving unit for generating the frequency signal based on the original signal and applying the generated frequency signal to the transducer.

2. An ultrasonic-actuator driving apparatus according to claim 1,
wherein the waveform averaging unit includes:
a waveform-information detector for detecting predetermined waveform information from the original signal;
a waveform-data storage for storing the waveform information sampled during a predetermined period as waveform data; and
an average-waveform-data calculator for averaging the waveform data to calculate the average-waveform data.

3. An ultrasonic-actuator driving apparatus according to claim 1,
wherein the position averaging unit includes:
a position-data storage for storing the absolute positions sampled during a predetermined period as position data; and
an average-position-data calculator for averaging the position data to calculate the average-position data.

4. An ultrasonic-actuator driving apparatus according to claim 1,
wherein the control-signal calculating unit includes:
a deceleration-starting-position calculator for calculating a starting position of deceleration of the driven body based on at least the average-waveform data and the average-position data; and
a control-signal generator that generates the control signal for controlling the frequency of the original signal so as to start deceleration drive of the driven body at the starting position of deceleration and supplies the generated control signal to the original-signal outputting unit.

5. An ultrasonic-actuator driving apparatus comprising:
an ultrasonic actuator including a transducer and a driven body that is in contact with the transducer, the transducer to which a frequency signal is applied friction-driving the driven body;
an original-signal outputting unit for outputting an original signal on which the frequency of the frequency signal depends;
a waveform-information detector for detecting predetermined waveform information from the original signal;
a waveform-data storage for storing the waveform information sampled during a predetermined period as waveform data;
an average-waveform-data calculator for averaging the waveform data to calculate average-waveform data;
a position detecting unit for detecting an absolute position of the driven body with respect to the transducer;
a position-data storage for storing the absolute positions sampled during a predetermined period as position data;
an average-position-data calculator for averaging the position data to calculate average-position data;

a deceleration-starting-position calculator for calculating a starting position of deceleration of the driven body based on at least the average-waveform data and the average-position data;

a stopping-range setting unit for setting a stopping range based on a target stopping position of the driven body set in a predetermined setting unit;

a control-signal generator that generates a control signal for controlling the frequency of the original signal so as to start deceleration drive of the driven body at the starting position of deceleration and a control signal for stopping the driven body within the stopping range, and supplies the generated control signals to the original-signal outputting unit; and a driving unit for generating the frequency signal based on the original signal and applying the generated frequency signal to the transducer.

6. An ultrasonic-actuator driving apparatus according to claim 5,
wherein the driving unit includes:
  a frequency-divider that receives the original signal;
  a phase-pulse generator for generating the frequency signal based on a pulse signal output from the frequency-divider; and
  an amplifier for amplifying the frequency signal output from the phase-pulse generator and applying the amplified frequency signal to the transducer.

7. An ultrasonic-actuator driving apparatus according to claim 5, further comprising:
  a stopping-position determining unit for determining whether the driven body is to be stopped by comparing the stopping range with the absolute position to generate a stop determination signal;
  a stopping unit that generates a stop signal for stopping the driven body within the stopping range based on the stop determination signal and supplies the generated stop signal to the original-signal outputting unit;
  a driving-direction setting unit for setting a driving direction based on the absolute position and the target stopping position.

8. An ultrasonic-actuator driving apparatus according to claim 5, further comprising an interrupting unit for generating an interrupting signal when the deceleration-starting-position calculator calculates the starting position of deceleration of the driven body a number of times not less than a predetermined number of times.

9. An ultrasonic-actuator driving apparatus according to claim 5, further comprising a stopping-interrupting unit for generating a stopping-interrupting signal even when the stopping-position determining unit determines that the driven body is not to be stopped a number of times not less than a predetermined number of times.

10. An ultrasonic-actuator driving method in which applying a frequency signal to a transducer in an ultrasonic actuator friction-drives a driven body that is in contact with the transducer, the ultrasonic-actuator driving method comprising:
  an original-signal outputting step of outputting an original signal on which the frequency of the frequency signal depends;
  a waveform averaging step of averaging the original signals during a predetermined period to calculate average-waveform data;
  a position detecting step of detecting an absolute position of the driven body with respect to the transducer;
  a position averaging step of averaging the absolute positions during a predetermined period to calculate average-position data;
  a control-signal calculating step of generating a control signal for controlling the frequency of the original signal based on the average-waveform data and the average-position data and of supplying the generated control signal to the original-signal outputting step; and
  a driving step of generating the frequency signal based on the original signal and applying the generated frequency signal to the transducer.

11. An ultrasonic-actuator driving method according to claim 10,
wherein the waveform averaging step includes:
  a waveform-information detecting step of detecting predetermined waveform information from the original signal;
  a waveform-data storing step of storing the waveform information sampled during a predetermined period as waveform data; and
  an average-waveform-data calculating step of executing a predetermined arithmetic operation for the waveform data to calculate the average-waveform data.

12. An ultrasonic-actuator driving method according to claim 10,
wherein the position averaging step includes:
  a position-data storing step of storing the absolute positions sampled during a predetermined period as position data; and
  an average-position-data calculating step of executing a predetermined arithmetic operation for the position data to calculate the average-position data.

13. An ultrasonic-actuator driving method according to claim 10,
wherein the control-signal calculating step includes:
  a deceleration-starting-position calculating step of calculating a starting position of deceleration of the driven body based on at least the average-waveform data and the average-position data; and
  a control-signal generating step of generating the control signal for controlling the frequency of the original signal so as to start deceleration drive of the driven body at the starting position of deceleration, and of supplying the generated control signal in the original-signal outputting step.

14. An ultrasonic-actuator driving method in which applying a frequency signal to a transducer in an ultrasonic actuator friction-drives a driven body that is in contact with the transducer, the ultrasonic-actuator driving method comprising:
  an accelerated driving step of performing acceleration drive of the driven body until the driven body reaches a predetermined speed;
  a waveform-information detecting step of detecting predetermined waveform information from an original signal on which the frequency of the frequency signal depends, after the acceleration drive;
  a waveform-data storing step of storing the waveform information sampled during a predetermined period as waveform data;
  an average-waveform-data calculating step of averaging the waveform data to calculate average-waveform data;
  a position detecting step of detecting an absolute position of the driven body with respect to the transducer after the acceleration drive;

a position-data storing step of storing the absolute positions sampled during a predetermined period as position data;

an average-position-data calculating step of averaging the position data to calculate average-position data;

a deceleration-starting-position calculating step of calculating a starting position of deceleration of the driven body based on at least the average-waveform data and the average-position data;

a deceleration determining step of determining whether deceleration drive of the driven body is to be started by comparing the starting position of deceleration with the absolute position after the acceleration drive; and a deceleration-control-signal generating step of generating a deceleration control signal for controlling the frequency of the original signal so as to start the deceleration drive of the driven body at the starting position of deceleration, when the deceleration determining step determines that the deceleration drive is to be started.

15. An ultrasonic-actuator driving method according to claim 14, further comprising:

a stopping-range setting step of setting a stopping range based on a target stopping position of the driven body set in predetermined setting means;

a position detecting step of detecting the absolute position of the driven body with respect to the transducer after the deceleration drive;

a stop determining step of determining whether the driven body is to be stopped by comparing the stopping range with the absolute position after the deceleration drive; and a stop-signal generating step of generating a stop signal for stopping the driven body within the stopping range, when the stop determining step determines that the driven body is to be stopped.

16. An ultrasonic-actuator driving method according to claim 14, further comprising an interrupting step of generating an interrupting signal when the calculation of the starting position of deceleration of the driven body is performed in the deceleration-starting-position calculating step a number of times not less than a predetermined number of times.

17. An ultrasonic-actuator driving method according to claim 14, further comprising a stopping-interrupting step of generating a stopping-interrupting signal even when the determination that the driven body is not to be stopped is performed in the stop determining step a number of times not less than a predetermined number of times.

18. An ultrasonic-actuator driving method according to claim 14, wherein new data takes priority over old data for storage in the waveform-data storing step and/or the position-data storing step.

* * * * *